United States Patent Office 2,985,782
Patented May 23, 1961

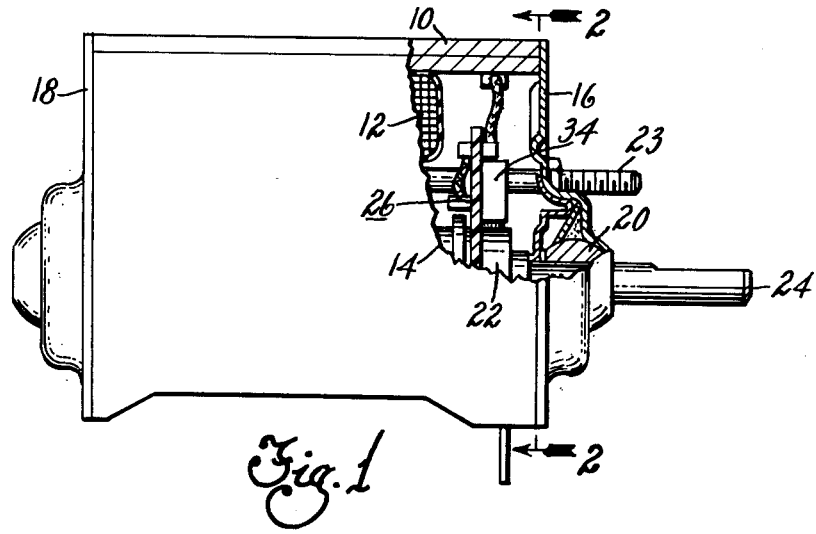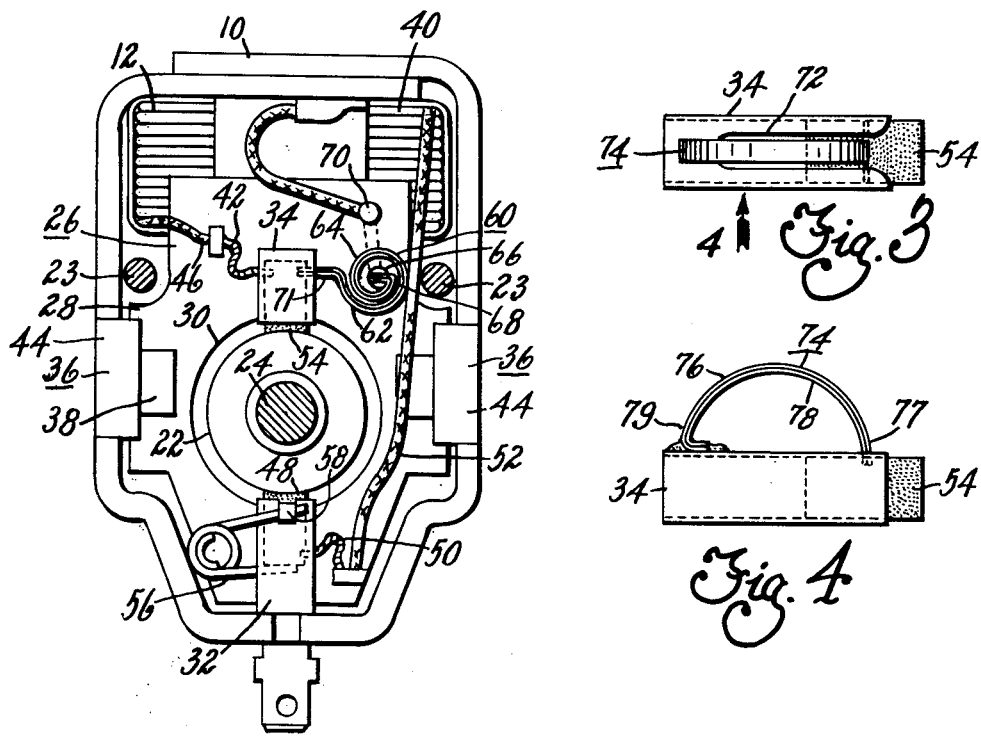
May 23, 1961 — R. C. STILES — 2,985,782
CURRENT COLLECTOR CONTACT MEANS
Filed Jan. 15, 1959
INVENTOR.
RICHARD C. STILES
BY
HIS ATTORNEY

2,985,782
CURRENT COLLECTOR CONTACT MEANS

Richard C. Stiles, Rochester, N.Y., assignor to General Motors Corporation, Detroit, Mich., a corporation of Delaware Filed Jan. 15, 1959, Ser. No. 786,987

9 Claims. (Cl. 310—240)

This invention pertains to dynamoelectric machines, and particularly to current collector contact means therefor embodying an integral overload circuit breaker.

Heretofore, small fractional horsepower dynamoelectric machines, such as the small direct current motors utilized to operate various accessories on motor vehicles, have embodied separate bimetallic overload circuit breakers to protect the motors. For example, in copending application Serial No. 664,009 filed June 6, 1957, in the name of Simmons et al. and assigned to the assignee of this invention, such a dynamoelectric machine includes a bimetallic thermal overload circuit breaker supported on the brush holder plate and electrically connected in series with the motor windings whereby when the motor is overloaded as evidenced by excessive current flow through the circuit breaker and motor windings, the circuit breaker will automatically open and deenergize the motor.

The present invention relates to a simplified brush rigging for dynamoelectric machines wherein one of the brush springs is formed of bimetal and is electrically connected in series with the motor windings so that when the motor is subjected to overload the bimetal spring will lift the brush out of engagement with the commutator so as to deenergize the motor. Accordingly, among my objects are the provision of improved current collector contact means for dynamoelectric machines; the further provision of a brush rigging structure for commutator type dynamoelectric machines including bimetallic spring means for biasing one of the brushes against the commutator; the further provision of an arcuate type bimetallic brush spring for dynamoelectric machines; and the still further provision of a spiral type bimetallic brush spring for dynamoelectric machines.

The aforementioned and other objects are accomplished in the present invention by connecting the movable end of the bimetallic spring with the brush such that upon the deflection of the bimetallic spring due to excessive current flowing through the motor, the brush will be disengaged from the commutator so as to deenergize the motor. Specifically, the improved current collector contact means are shown embodied in a motor of the type as disclosed in copending application Serial No. 680,238 filed August 26, 1957, in the name of Simmons et al. and assigned to the assignee of the present invention. However, the specific embodiment disclosed is to be construed only by way of example since the invention can obviously be embodied in any type of dynamoelectric machine. As disclosed, the current collector contact means include a phenolic brush holder plate having a pair of metallic brush holders, or boxes, attached thereto. Each brush box supports a brush, and the brush holder plate is formed with a centrally located opening designed to accommodate the commutator of the motor. One of the brushes is biased into engagement with the commutator by a conventional type of brush spring.

In one embodiment, the other brush box has one end of an arcuate bimetallic spring connected thereto, the other end of the bimetallic spring being secured to the brush. Normally, the bimetallic spring biases the brush into engagement with the commutator. However, when the motor is overloaded, the bimetallic brush spring becomes heated and the free end thereby moves toward the fixed end so as to lift the brush out of engagement with the commutator.

In the second embodiment, the bimetallic brush spring is wound in spiral shape, the inner end being connected to the ground lug, and the outer end being secured to the brush. When the motor is subjected to an overload the spiral bimetallic spring winds up thereby lifting the brush out of engagement with the motor commutator.

Further objects and advantages of the present invention will be apparent from the following description, reference being had to the accompanying drawing, wherein preferred embodiments of the present invention are clearly shown.

In the drawing:

Figure 1 is a side view, partly cut away and partly in section, of a dynamoelectric machine constructed according to the present invention.

Figure 2 is a view, partly in section and partly in elevation, taken along line 2—2 of Figure 1 illustrating one embodiment of the present invention.

Figures 3 and 4 are front and side views, respectively, illustrating the second embodiment of the present invention.

With reference to Figure 1, the present invention is embodied in a motor having a steel frame 10 of substantially rectangular configuration. The motor comprises a stator, partly shown as indicated by numeral 12, and an armature 14 journalled within the end caps 16 and 18 of the frame, or housing by spaced bearing means, one of which is indicated by numeral 20. A commutator 22 is attached to and rotates with the rotor 14, and as indicated the end caps 16 and 18 are held in assembled relation with the frame 10 by tie bolts such as indicated by numeral 23. A shaft 24 attached to the rotor 14, extends through the end cap 16.

A current collector contact device 26 is disposed within the motor housing. The current collector contact device includes a plate 28 of insulating material which, as seen in Figure 2, is formed with a central aperture 30 designed to accommodate the commutator 22. A pair of metallic brush boxes 32 and 34 are attached to the plate 28, the brush boxes being diametrically opposed and substantially radial to the central opening 30 therein.

The brush holder plate 28 is held in assembled relation with the frame 10 by a pair of spring clips 36, which may be of the type disclosed in the aforementioned copending application Serial No. 680,248. Thus, each spring clip 36 comprises a piece of sheet metal having a pair of spring fingers, one of which is indicated by numeral 38, received by a notch in the plate 28. The ends 44 of the clips 36 are clamped between the frame 10 and the end cap 16.

The brush holder 32 slidably supports a brush 48 having a conventional pigtail 50 which is electrically connected by wire 52 to one end of field winding 40. The brush holder box 34 slidably supports a brush 54 that is connected with the novel overload circuit breaker construction of the present invention. The brush 54 has a pigtail 42 connected by wire 46 to the other end of field winding 40. The brush 48 is biased into engagement with the commutator 22 by a torsion spring 56, one end of which is engageable with a tang 58 on the brush box 32, and the other end of which extends through a slot in the brush box 32 and engages the end of the brush 48.

In the first embodiment, the overload circuit breaker comprises a spiral bimetallic spring 60 having a high expansion side 62 and a low expansion side 64. The inner end 68 of the spiral bimetallic spring 60 is connected to a slotted stud 66 and electrically connected to a ground lug 70 carried by the brush holder plate 28. The free end of the bimetallic spiral spring 60 extends through a slot in the brush box 34 and is electrically and mechanically connected to the brush 54. The spiral bimetallic spring 60 normally biases the brush 54 into engagement with the commutator 22 so as to complete the circuit connections for the motor.

The bimetallic spring 60 is electrically connected in series with the motor windings, and thus the total current flow through the motor passes through the bimetallic spiral spring 60. The characteristics of the bimetallic spring 60 are so that when the motor is overloaded as evidenced by excessive current flowing through the motor windings and the spring 60, the bimetallic spring 60 will become heated due to current flow therethrough and the free end 71 will wind up thereby lifting the brush 54 out of engagement with the commutator 22 so as to interrupt the energizing circuit for the motor.

With reference to Figures 3 and 4, in the second embodiment the brush box 34 is shown with an elongated slot 72 in one side thereof. In this embodiment, the overload circuit breaker comprises an arcuate bimetallic spring 74 having a high expansion side 76 and a low expansion side 78. One end of the spring 74 is mechanically and electrically connected to the brush 54 and extends through the slot 72, and the other end of the bimetallic spring 74 is soldered or otherwise electrically connected to the brush box 34. The bimetallic spring 74 may be electrically connected to the ground lug of the brush holder plate 28 as in the embodiment of Figure 2.

In the second embodiment, when the motor is subjected to an overload, excessive current through the spring 74 will cause the bimetallic spring to deflect so that the end 77 will move towards the fixed end 79 thereby retracting the brush 54 so as to lift it out of engagement with the commutator 22. Accordingly, the circuit for the motor will be automatically interrupted when the motor is subjected to an overload. The bimetallic springs of both embodiments respond to both ambient temperature within the motor housing as well as heat produced by current flowing therethrough.

From the foregoing it is apparent that the present invention provides a unique arrangement wherein the thermal overload circuit breaker is embodied as an integral part of the current collector contact means thereby eliminating the necessity for a separate thermal overload circuit breaker such as heretofore used.

While the embodiments of the invention as herein disclosed constitutes preferred forms, it is to be understood that other forms might be adopted.

What is claimed is as follows:

1. In a dynamoelectric machine having a housing and a current collector member rotatably supported therein, current collector contact means within the housing including, a plate secured to the housing and having an opening therein to accommodate said current collector member, a pair of brushes supported on said plate, and means biasing said brushes against said current collector member including at least one bimetallic spring electrically connected with one of said brushes and adapted to disengage said one brush from said current collector member in response to overloading of said dynamo electric machine.

2. Current collector contact means for a dynamoelectric machine having a current collector member, including, a brush engageable with said current collector member, and bimetallic spring means biasing said brush into engagement with said collector member and operable to disengage said brush from said current collector member in response to overheating.

3. Current collector contact means for a dynamoelectric machine having a current collector member, including, a brush engageable with said current collector member, a bimetallic spring associated with said brush for biasing it into engagement with said current collector member, and means connecting said bimetallic spring in circuit with the windings of said dynamoelectric machine whereby said bimetallic spring will move said brush out of engagement with said current collector member in response to excessive current flowing therethrough.

4. Current collector contact means for a dynamoelectric machine having a current collector member, including, a pair of brushes engageable with said current collector member, and spring means for biasing said brushes into engagement with said current collector member, at least one of said spring means being composed of bimetal and operable to disengage its respective brush from said current collector member in response to overheating.

5. Current collector contact means for a dynamoelectric machine having a current collector member, including, a pair of brushes engageable with said current collector member, spring means for biasing said brushes into engagement with said current collector member, at least one of said spring means being composed of bimetal, and means connecting said bimetallic spring in series with the windings of said dynamoelectric machine whereby said bimetallic spring means will disengage said one brush from said current collector member in response to excessive current flow therethrough.

6. In a dynamoelectric machine having a housing and a current collector member rotatably supported therein, the current collector contact means within the housing including, a plate of insulating material secured to the housing and having an opening therein to accommodate said current collector member, a pair of brushes supported on said plate, and spring means biasing said brushes against said current collector member including at least one bimetallic spring electrically connected in series with the windings of said dynamoelectric machine and adapted to disengage said one brush from said current collector member, in response to excessive current flow therethrough.

7. In a dynamoelectric machine having a housing and a current collector member rotatably supported therein, the current collector contact means within the housing including, a plate of insulating material secured to the housing and having openings therein to accommodate said current collector member, a pair of brush boxes attached to said plate, a brush slidably supported in each brush box, and spring means biasing said brushes against said current collector member including at least one bimetallic spring which is operable to disengage one of said brushes from said current collector member in response to overheating.

8. The current collector contact means set forth in claim 7 wherein said bimetallic spring means comprises an arcuate bimetallic spring, one end of which is secured to one of said brush boxes and the other end of which is secured to said one brush.

9. The current collector contact means set forth in claim 7 wherein said bimetallic spring means comprises a spirally wound bimetallic spring, the inner end of which is connected to said plate, and the other end of which is connected to said one brush.

References Cited in the file of this patent

UNITED STATES PATENTS 2,763,800     Curley _____ Sept. 18, 1956

FOREIGN PATENTS 210,774     Germany _____ June 5, 1909